United States Patent
Yokoi et al.

(10) Patent No.: US 12,399,192 B2
(45) Date of Patent: Aug. 26, 2025

(54) SAMPLE PLATE SUPPLY CONTROL DEVICE, SAMPLE PLATE SUPPLY CONTROL SYSTEM, SAMPLE PLATE SUPPLY CONTROL METHOD AND NON-TRANSITORY COMPUTER READABLE MEDIUM STORING SAMPLE PLATE SUPPLY CONTROL PROGRAM

(71) Applicant: SHIMADZU CORPORATION, Kyoto (JP)

(72) Inventors: Yusuke Yokoi, Kyoto (JP); Tsuyoshi Morikawa, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 617 days.

(21) Appl. No.: 17/270,839

(22) PCT Filed: Aug. 30, 2018

(86) PCT No.: PCT/JP2018/032223
§ 371 (c)(1),
(2) Date: Feb. 23, 2021

(87) PCT Pub. No.: WO2020/044515
PCT Pub. Date: Mar. 5, 2020

(65) Prior Publication Data
US 2021/0190807 A1    Jun. 24, 2021

(51) Int. Cl.
*G01N 35/04* (2006.01)
*G01N 35/00* (2006.01)

(52) U.S. Cl.
CPC ....... *G01N 35/04* (2013.01); *G01N 35/00732* (2013.01); *G01N 2035/00752* (2013.01)

(58) Field of Classification Search
CPC .............. G01N 2035/00752; G01N 35/00732
See application file for complete search history.

(56) References Cited

U.S. PATENT DOCUMENTS 4,798,095 A  *  1/1989  Itoh ................... G01N 35/1065
                                                              422/63
5,061,639 A  *  10/1991  Lung ................ G01N 35/00594
                                                              356/627

(Continued)

FOREIGN PATENT DOCUMENTS

JP       05-172825 A      7/1993
JP       05-180732 A      7/1993

(Continued)

OTHER PUBLICATIONS

Notice of Reasons for Refusal for corresponding JP Patent Application No. 2020-539966 dated Mar. 29, 2022, with English language machine translation.

(Continued)

*Primary Examiner* — Laura Martin
*Assistant Examiner* — Alex T Devito
(74) *Attorney, Agent, or Firm* — Renner, Otto, Boisselle & Sklar, LLP (57) ABSTRACT

A sample plate supply control device controls supply of a sample plate from a sample plate holder having a plurality of sample plate containers to an autosampler, and includes an identification information recognizer that recognizes identification information of a contained sample plate when a sample plate is contained in one sample plate container among the plurality of sample plate containers, and a supply instructor that instructs the sample plate holder to supply the sample plate contained in the one sample plate container to the autosampler in a case where identification information of a subject sample plate to be analyzed matches the identification information recognized by the identification information recognizer.

10 Claims, 8 Drawing Sheets

(56) References Cited

U.S. PATENT DOCUMENTS

| | | | | |
|---|---|---|---|---|
| 5,498,545 | A * | 3/1996 | Vestal | H01J 49/0495 |
| | | | | 250/423 P |
| 5,720,377 | A * | 2/1998 | Lapeus | G01N 35/04 |
| | | | | 198/465.1 |
| 5,892,458 | A | 4/1999 | Anderer | |
| 6,351,690 | B1 * | 2/2002 | Lenz | G01N 35/0099 |
| | | | | 435/468 |
| 8,915,421 | B2 * | 12/2014 | Lavi | G01N 35/04 |
| | | | | 235/475 |
| 2001/0013494 | A1 * | 8/2001 | Maiefski | B01D 15/1885 |
| | | | | 210/656 |
| 2011/0153220 | A1 * | 6/2011 | Bolea | G01N 35/00732 |
| | | | | 702/19 |

FOREIGN PATENT DOCUMENTS

| | | |
|---|---|---|
| JP | 08-313538 A | 11/1996 |
| JP | 09-171022 A | 6/1997 |
| JP | 09-178739 A | 7/1997 |
| JP | 2006-189362 A | 7/2006 |
| JP | 2012-021911 A | 2/2012 |
| JP | 2015-111119 A | 6/2015 |
| JP | 2016-156632 A | 9/2016 |

OTHER PUBLICATIONS

International Search Report with respect to International Patent Application No. PCT/JP2018/032223, mailed Dec. 4, 2018.
Written Opinion of the International Searching Authority with respect to International Patent Application No. PCT/JP2018/032223, mailed Dec. 4, 2018 (English Machine Translation).

* cited by examiner

SAMPLE PLATE SUPPLY CONTROL DEVICE, SAMPLE PLATE SUPPLY CONTROL SYSTEM, SAMPLE PLATE SUPPLY CONTROL METHOD AND NON-TRANSITORY COMPUTER READABLE MEDIUM STORING SAMPLE PLATE SUPPLY CONTROL PROGRAM

TECHNICAL FIELD

The present invention relates to a sample plate supply control device including a sample plate holder that holds a sample plate to be supplied to an autosampler, and a sample plate supply control system. The present invention further relates to a sample plate supply control method and a non-transitory computer readable medium storing a sample plate supply control program.

BACKGROUND ART

There is an analysis system including a liquid chromatograph. The analysis system includes a plurality of function units, a control device and a computer. The control device controls the plurality of function units. The computer examines chromatogram data. The plurality of function units have a pump, an oven, a detector and so on that are included in the liquid chromatograph. Further, the plurality of function units include an autosampler that injects a sample to be analyzed into the liquid chromatograph, a plate changer that supplies a sample plate containing a sample to the autosampler, etc. A program for controlling the analysis system and examining chromatogram data are installed, whereby the computer that examines chromatogram data functions as a CDS (Chromatography Data System).

A user places a sample plate containing a sample vial in the plate changer in advance in order to start an analysis process. Next, the user operates the computer functioning as the CDS to select a sample plate for which the analysis process is to be started. In response to this operation, a subject sample plate is taken out from the plate changer and supplied to the autosampler. Thus, the autosampler injects a sample into the liquid chromatograph, and the analysis process is started.

A plurality of sample plates can be contained in the plate changer. In a case where 30 sample plates can be contained in the plate changer, for example, the numbers from 1 to 30 are displayed on the plate changer to correspond to sample plate containers. When operating the computer to start the analysis process, the user designates the number of a sample plate container using the computer. When placing a sample plate in the sample plate container numbered 10, for example, the user provides an instruction for starting the analysis process with respect to the sample plate container numbered 10 using the computer.

The below-mentioned Patent Document 1 discloses an analysis system comprising a rack waiting place (plate changer) that can contain a plurality of racks (sample plates).

[Patent Document 1] JP 2006-189362 A

SUMMARY OF INVENTION

Technical Problem

As described above, the plate changer that can contain the plurality of sample plates may be attached to the autosampler. The plate changer can contain the plurality of sample plates at the same time. Therefore, the user may erroneously select a position at which a sample plate is to be contained in the plate changer. Alternatively, the user may erroneously designate a position at which a sample plate is contained when operating the computer.

The user may have an analysis instruction, etc. that may designate a position at which a sample plate is to be contained in advance. Even in such a case, in an environment in which a plurality of users use a common analysis system, another user may have already placed another sample plate at a position, where a sample plate is to be contained, designated by the analysis instruction. Under such a circumstance, the user must replace the sample plate with the other sample plate.

In a case where another user has already placed another sample plate at a position, where a sample plate is to be contained, designated by the analysis instruction, the user may place the sample plate in another available sample plate container. In this case, the user must operate the computer to change a set plate position.

Further, after placing a sample plate in the plate changer, the user must move to the location of the computer and again operate the computer to provide an instruction for starting an analysis. In a case where the plate changer and the computer are located at a distance from each other, work is complicated and requires an unnecessary time.

An object of the present invention is optimization of work for placing a sample plate and provision of an instruction for supplying the sample plate in a sample plate supply control device including a sample plate holder that can contain a plurality of sample plates, and a sample plate supply control system.

Solution to Problem (1) A sample plate supply control device according to one aspect of the present invention controls supply of a sample plate from a sample plate holder having a plurality of sample plate containers to an autosampler, and includes an identification information recognizer that recognizes identification information of a contained sample plate when a sample plate is contained in one sample plate container among the plurality of sample plate containers, and a supply instructor that instructs the sample plate holder to supply the sample plate contained in the one sample plate container to the autosampler in a case where identification information of a subject sample plate to be analyzed matches the identification information recognized by the identification information recognizer.

This sample plate supply control device recognizes the identification information of the sample plate contained in the one sample plate container among the plurality of sample plate containers. Then, in a case where the identification information of the subject sample plate matches the recognized identification information of the sample plate, the sample plate supply control device supplies the sample plate contained in the one sample plate container to the autosampler. Thus, even in a case where the sample plate is contained in any sample plate container, the subject sample plate is supplied to the autosampler.

The user does not have to be conscious of which sample plate container the sample plate is to be contained in, in the sample plate holder. The user may place the sample plate in an available sample plate container. An analysis process does not start with respect to a different sample plate due to an erroneous operation. Even in a case where a plurality of users use a common sample plate holder, each user can freely utilize an available sample plate container.

(2) The supply instructor may notify the autosampler of process information and may provide an instruction for executing a process on the sample plate contained in the one sample plate container based on the process information in a case where the identification information of the subject sample plate matches the identification information recognized by the identification information recognizer.

In a case where the identification information of the subject sample plate matches the recognized identification information of the sample plate, this sample plate supply control device supplies the sample plate contained in the one sample plate container to the autosampler. At this time, the sample plate supply control device notifies the autosampler of process information in regard to the subject sample plate. Thus, even in a case where the sample plate is contained in any sample plate container, the process is started with respect to the subject sample plate based on the process information.

(3) The supply instructor may wait until a process with respect to another sample plate is completed and may instruct the sample plate holder to supply the sample plate contained in the one sample plate container to the autosampler in a case where the identification information of the subject sample plate matches the identification information recognized by the identification information recognizer, and the process is being executed on the another sample plate in the autosampler.

In a case where the identification information of the subject sample plate matches the recognized identification information of the sample plate, this sample plate supply control device determines whether the autosampler is executing a process with respect to another sample plate. When the autosampler is executing a process with respect to another sample plate, the sample plate supply control device supplies the sample plate contained in the one sample plate container to the autosampler after the process with respect to the other sample plate is completed. Thus, even when the autosampler is executing a process with respect to the other sample plate, reservation of execution of a process with respect to the subject sample plate is made. The user can make settings for the subject sample plate regardless of whether the autosampler is executing a process with respect to another sample plate.

(4) The supply instructor may instruct the sample plate holder to supply the sample plate contained in the one sample plate container to the autosampler in a case where identification information of any subject sample plate among a plurality of subject sample plates matches the identification information recognized by the identification information recognizer.

In a case where any identification information of the plurality of subject sample plates matches the recognized identification information of the sample plate, this sample plate supply control device supplies the sample plate contained in the one sample plate container to the autosampler. Thus, even in a case where the sample plate is contained in any sample plate container, any subject sample plate among the plurality of subject sample plates is supplied to the autosampler. The user can make reservation for the analysis process with respect to the plurality of subject sample plates at the same time.

(5) A print module that prints the identification information of the subject sample plate to be attached to the subject sample plate may further be included.

The identification information to be attached to the subject sample plate is printed. The user can make settings for the subject sample plate and print the identification information to be attached to the subject sample plate.

(6) The identification information of the subject sample plate may be attached to the subject sample plate as a barcode image.

The identification information is attached to the subject sample plate as a barcode image. The identification information of the subject sample plate can be read with use of a barcode reading function.

(7) A sample plate supply control system according to another aspect of the present invention includes an autosampler that injects a sample to be analyzed into an analysis device, a sample plate holder that has a plurality of sample plate containers, and a terminal device that controls the sample plate holder, wherein the sample plate holder includes an identification information recognizer that recognizes identification information of a contained sample plate when the sample plate is contained in one sample plate container among the plurality of sample plate containers, and an identification information presenter that supplies the identification information of the contained sample plate to the terminal device, and the terminal device includes an identification information acquirer that acquires the identification information of the contained sample plate from the sample plate holder, and a supply instructor that instructs the sample plate holder to supply the sample plate contained in the one sample plate container to the autosampler in a case where identification information of a subject sample plate to be analyzed matches the identification information acquired by the identification information acquirer.

This sample plate supply system recognizes the identification information of the sample plate contained in the one sample plate container among the plurality of sample plate containers. Then, in a case where the identification information of the subject sample plate matches the recognized identification information of the sample plate, the sample plate supply control system supplies the sample plate contained in the one sample plate container to the autosampler. Thus, even in a case where the sample plate is contained in any sample plate container, the subject sample plate is supplied to the autosampler.

(8) The sample plate holder may have a plurality of displays provided to correspond to the plurality of sample plate containers, and each display may display a processing state in regard to each sample plate contained in each sample plate container.

The display displays a processing state of a sample plate in each sample plate container. The user can identify an available sample plate container.

(9) A sample plate supply control method according to yet another aspect of the present invention of controlling supply of a sample plate from a sample plate holder having a plurality of sample plate containers to an autosampler, includes acquiring identification information of a contained sample plate from the sample plate holder when the sample plate is contained in one sample late container among the plurality of sample plate containers, and instructing the sample plate holder to supply the sample plate contained in the one sample plate container to the autosampler in a case where identification information of a subject sample plate to be analyzed matches the identification information acquired from the sample plate holder.

(10) A non-transitory computer readable medium storing a sample plate supply control program according to yet another aspect of the present invention controls supply of a sample plate from a sample plate holder having a plurality of sample plate containers to an autosampler, wherein the sample plate supply control program causes a computer to execute the processes of acquiring identification information of a contained sample plate from the sample plate holder when the sample plate is contained in one sample plate container among the plurality of sample plate containers, and instructing the sample plate holder to supply the sample plate contained in the one sample plate container to the autosampler in a case where identification information of a subject sample plate to be analyzed matches the identification information acquired from the sample plate holder.

(11) The sample plate supply control device described in (1) may further include a subject plate setter that sets the identification information of the subject sample plate and a method file in which an execution condition of an analysis process is written, in association with each other, wherein the supply instructor may have a process instructor that acquires a method file associated with the subject sample plate by the subject plate setter and instructs the autosampler to execute the analysis process based on the method file.

Advantageous Effects of Invention

The present invention can optimize work for placing a sample plate and provision of an instruction for supplying the sample plate in a sample plate supply control device including a sample plate holder that can contain a plurality of sample plates and a sample plate supply control system.

DESCRIPTION OF EMBODIMENTS

A sample plate supply control device, a sample plate supply control system, a sample plate supply control method and a sample plate supply control program according to embodiments of the present invention will be described below in detail with reference to the drawings.

[1] First Embodiment (1) Overall Configuration of Analysis System

Figure 1:
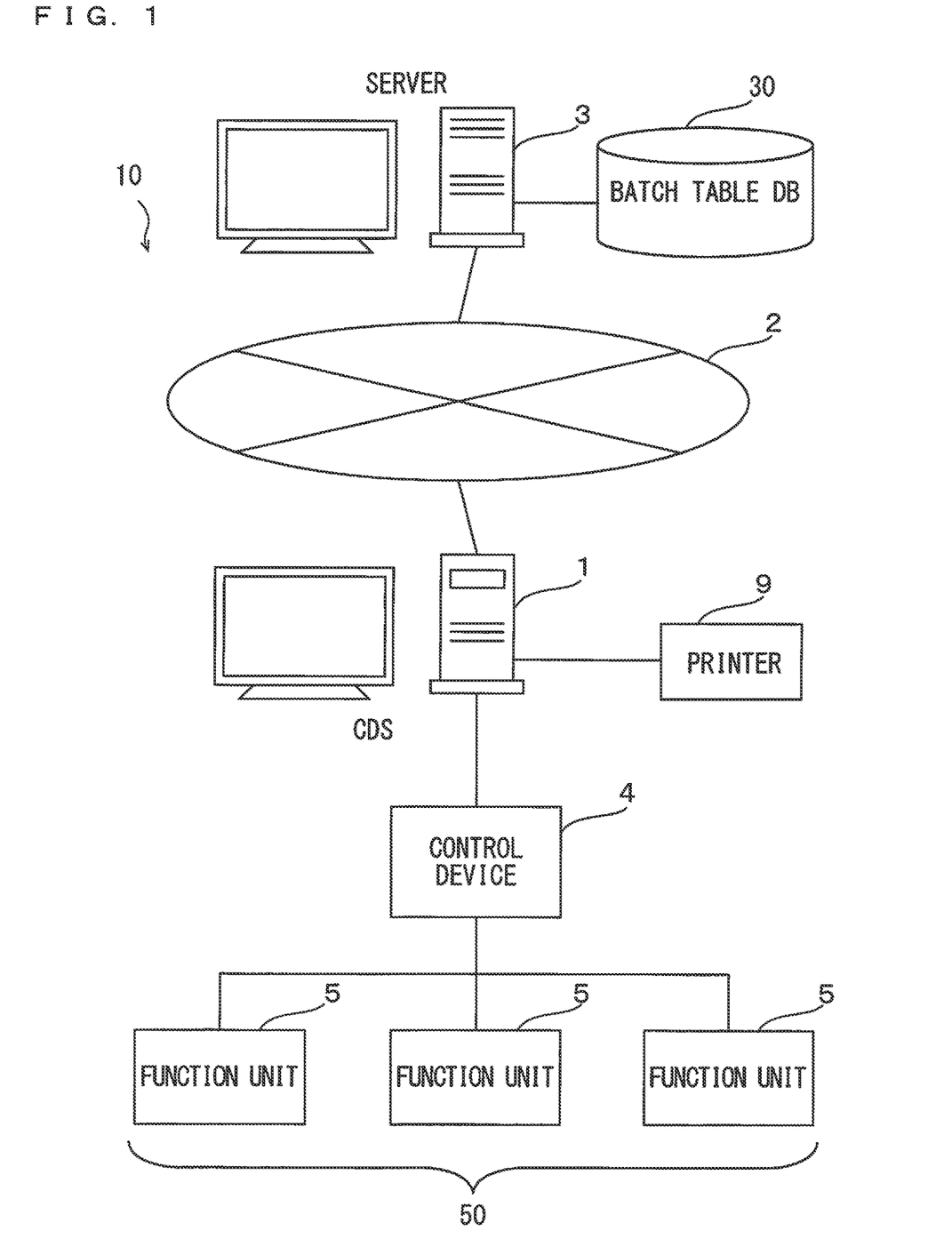
FIG. 1 is an overview of an analysis system according to the present embodiment.

FIG. 1 is an overview of an analysis system 10 according to the present embodiment. The analysis system 10 shown in FIG. 1 includes a computer 1, a network 2, a server 3, a control device 4, a plurality of function units 5 and a printing machine 9. In the present embodiment, a liquid chromatograph 50 is constituted by the plurality of function units 5. The liquid chromatograph 50 is a high-performance liquid chromatograph, for example.

The computer 1 is a general personal computer, for example. The computer 1 executes a process of controlling the analysis system 10, a process of examining chromatogram data, etc.

The network 2 is a computer network such as a LAN (Local Area Network). The computer 1 and the server 3 are connected to each other via the network 2.

The server 3 is a general computer server, for example. A batch table data base 30 (hereinafter abbreviated as a batch table DB 30) is saved in a storage of the server 3. The batch table DB 30 accumulates a plurality of batch tables. The batch table is the data in which the execution procedure and execution conditions of an analysis process to be executed in the analysis system 10 are written. The batch table is set in regard to a sample plate 8 (FIGS. 2A and 2B) that contains a plurality of sample vials.

The batch table includes a plurality of records. One record is a record corresponding to one sample vial contained in a sample plate. In one record, the identification information of a sample plate 8, the number of a sample vial, a sample type and the name of a method file are written. A method file is a data file in which the execution procedure and execution conditions of the analysis process are written. That is, in the batch table, a method file in which the content of an analysis process is written is set for each sample vial. Because a plurality of sample vials are contained in the sample plate 8, the records corresponding to all of the sample vials contained in the sample plate 8 are included in the batch table.

The control device 4 is connected to the computer 1 via a communication cable. Further, the control device 4 is connected to the plurality of function units 5 via communication cables. The analysis system 10 includes the plurality of function units 5. The plurality of function units 5 include a pump, an oven, a detector and so on in the liquid chromatograph 50. Further, the plurality of function units 5 include an autosampler 7 (see FIG. 3) that injects a sample to be analyzed into the liquid chromatograph 50, a plate changer 6 (see FIG. 3) that supplies a sample plate containing a sample to the autosampler 7, etc.

(2) Configuration of Sample Plate and Plate Changer

Figure 2A:
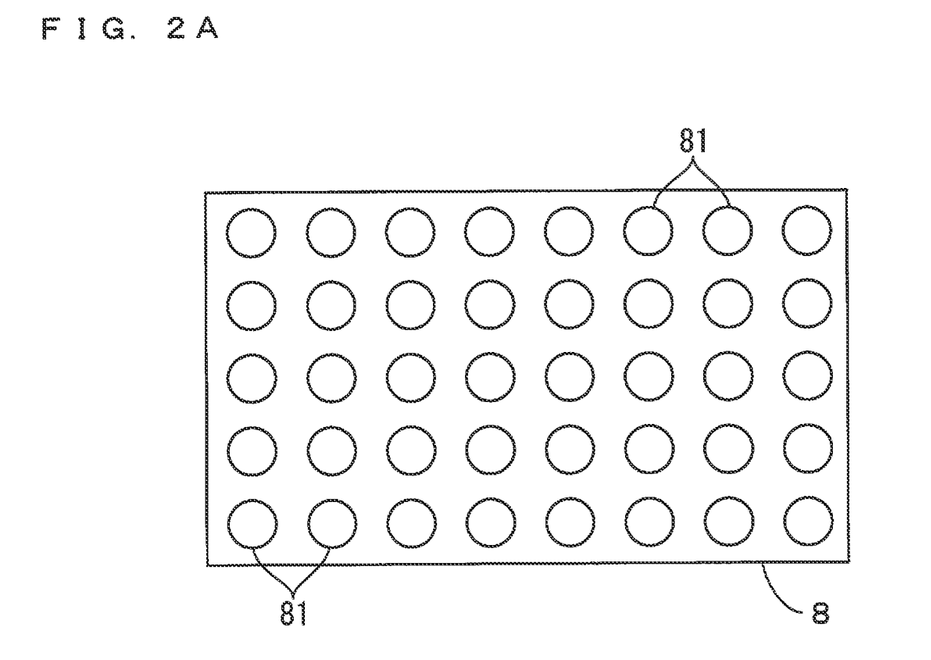
FIG. 2A is a plan view of a sample plate.
Figure 2B:
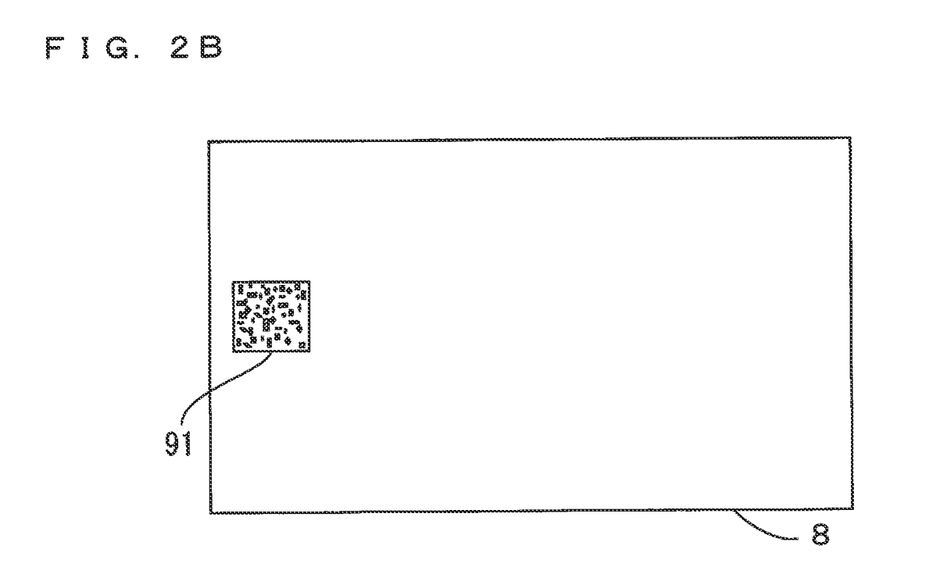
FIG. 2B is a back view of a sample plate.
Figure 3:
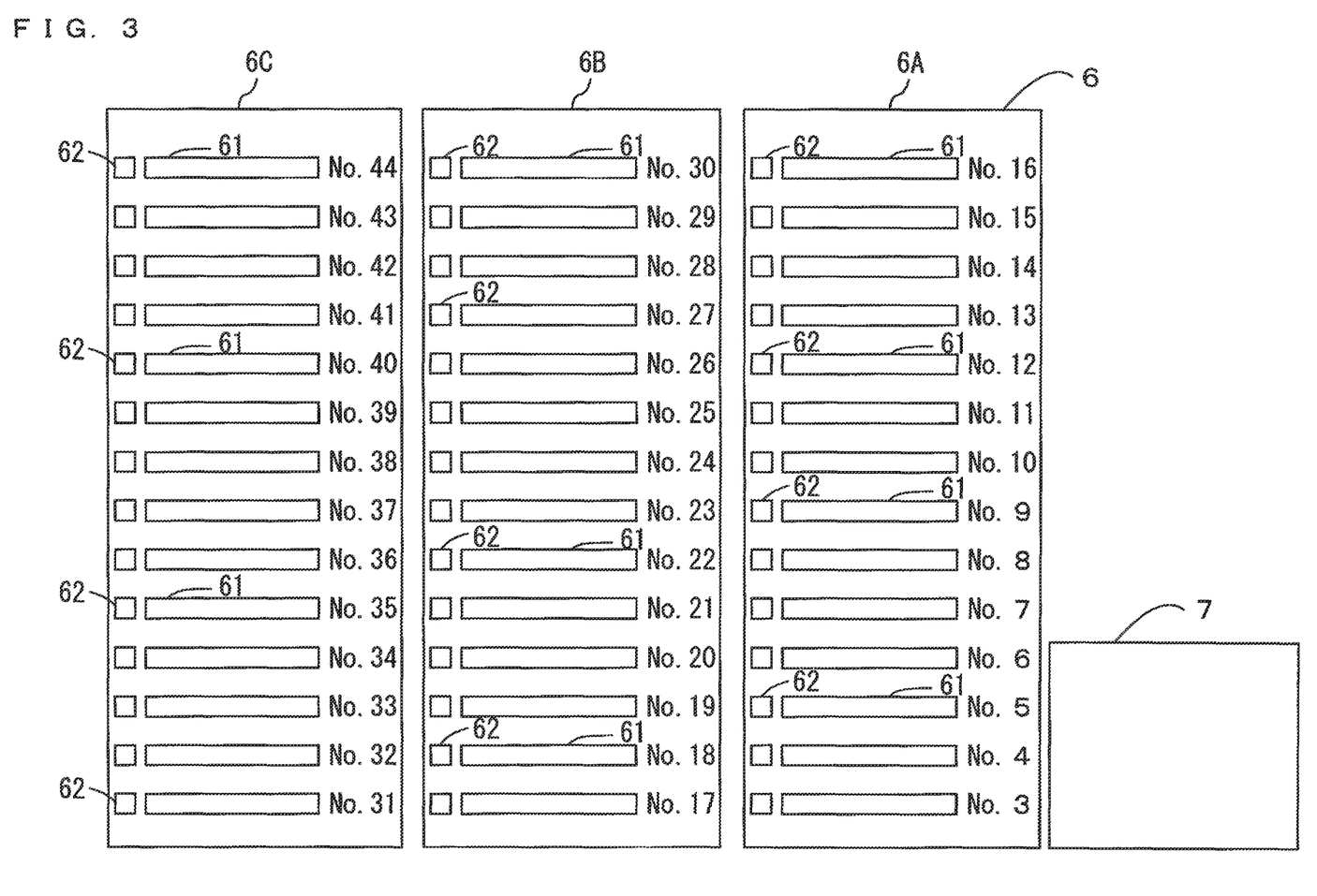
FIG. 3 is a diagram showing a plate changer and an autosampler according to the present embodiment.

FIG. 2A shows a plan view of the sample plate 8. FIG. 2B shows a back view of the sample plate 8. FIG. 3 is a diagram showing the configuration of the plate changer 6. First, the sample plate 8 will be described with reference to FIGS. 2A and 2B.

As shown in FIG. 2A, a plurality of holes 81 in which sample vials are contained are provided in the sample plate 8. As shown in FIG. 2B, a barcode 91 is attached to the back surface of the sample plate 8 of the present embodiment. The information for identifying the sample plate 8 is written in the barcode 91 as identification information. Although details will be described below, the barcode 91 is read when the sample plate 8 is contained in the plate changer 6, so that the contained sample plate 8 is specified.

As show in FIG. 3, the plate changer 6 is provided next to the autosampler 7 as a device attached to the autosampler 7. The plate changer 6 can hold a plurality of sample plates 8. The sample plate 8 can contain a plurality of sample vials containing samples to be analyzed.

In the plate changer 6 of the present embodiment, three changers 6A, 6B, 6C are provided. Each of the three changers 6A, 6B, 6C can contain a plurality of sample plates 8 (fourteen sample plates 8 can be contained in this example). The changer 6A includes sample plate containers 61 numbered 3 to 16. The changer 6B includes sample plate containers 61 numbered 17 to 30. The changer 6C includes sample plate containers 61 numbered 31 to 44. Since sample plate containers numbered 1 and 2 are provided in the autosampler 7, numbering of the sample plate containers 61 in the changer 6A starts from 3.

As shown in FIG. 3, a display 62 is provided next to each sample plate container 61. An LED is used in a display 62 in the present embodiment. A display 62 displays a processing state of a sample plate 8 contained in a sample plate container 61. In the present embodiment, in a case where an analysis process of a sample plate 8 contained in a sample plate container 61 is not completed, a display 62 lights up in red. In a case where a display 62 next to a sample plate container 61 numbered 25 lights up in red, for example, the user can judge that a sample plate 8 contained in the sample plate container 61 numbered 25 has not been processed. That is, the user can judge that the sample plate 8 contained in the sample plate container 61 numbered 25 is in a standby state.

While a display 62 lights up in red in a case where an unprocessed sample plate 8 is contained in the present embodiment, another processing state of the sample plate 8 may be identified. For example, in regard to a sample plate container 61 containing a sample plate 8 for which an analysis process is completed, an adjacent display 62 may light up in green. Alternatively, in a case where a sample plate 8 is being transported and carried into the autosampler 7, that is, in regard to a sample plate container 61 corresponding to a sample plate for which an analysis process is being executed, an adjacent display 62 may light up in orange.

(3) Functional Configuration of Sample Plate Supply Control System

Figure 4:
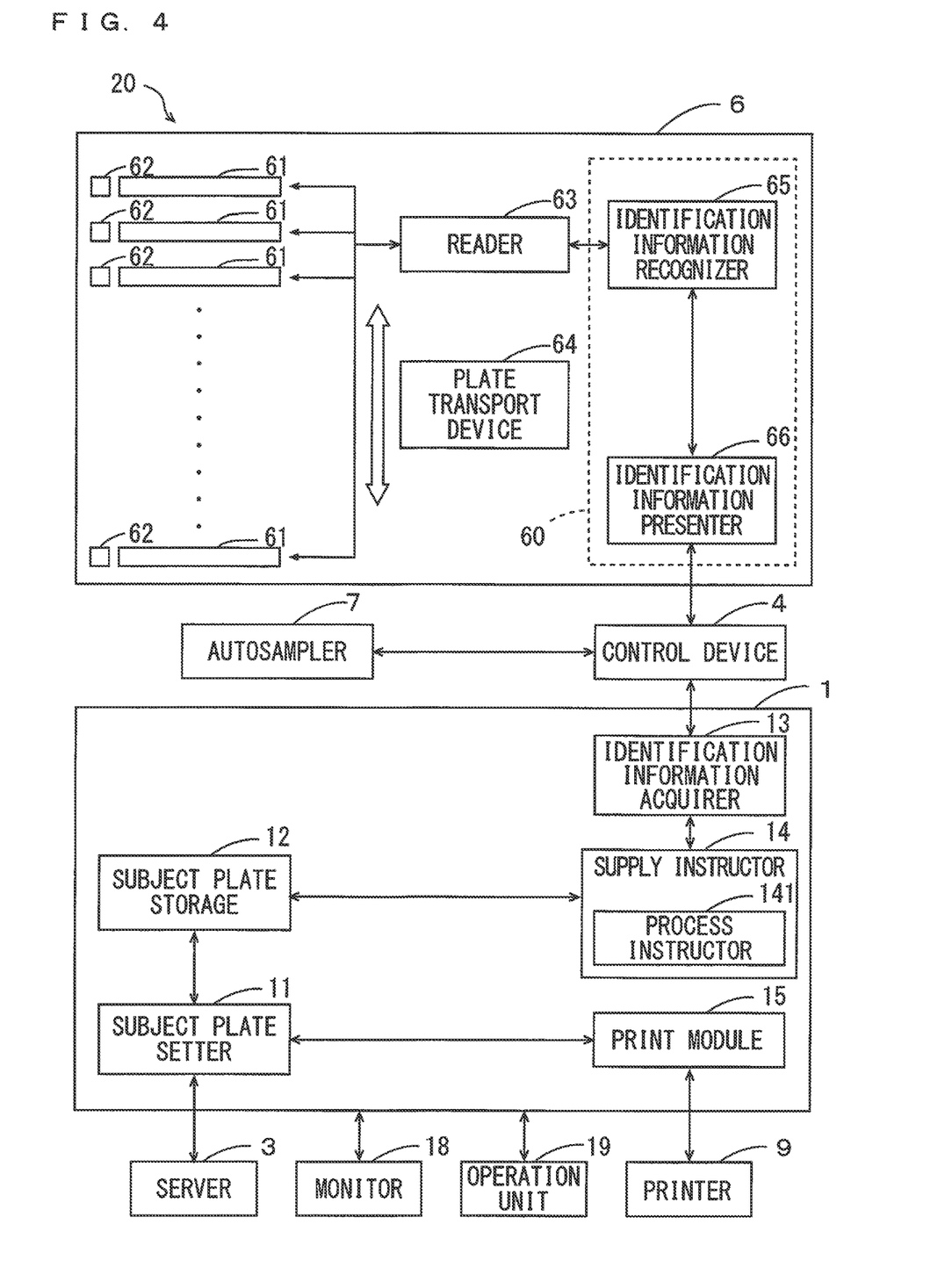
FIG. 4 is a block diagram of the functions of a sample plate supply control system according to the present embodiment.

FIG. 4 is a block diagram of the functions of the sample plate supply control system 20. As shown in FIG. 4, the plate changer 6 includes a reader 63, a plate transport device 64, an identification information recognizer 65 and an identification information presenter 66. The plate changer 6 has a controller 60 constituted by a CPU (Central Processing Unit), a RAM (Random Access Memory), a ROM (Read Only Memory) and so on. A computer program such as a first control program is stored in the ROM. The CPU executes the first control program stored in the ROM on the RAM, whereby functions of the identification information recognizer 65 and the identification information presenter 66 are implemented. Part or all of the identification information recognizer 65 and the identification information presenter 66 may be implemented by hardware such as an electronic circuit.

The reader 63 acquires the information written in the barcode 91 by reading the barcode 91 attached to a sample plate 8 contained in each sample plate container 61, and supplies the acquired information and the number of a sample plate container 61 storing the sample plate 8 to the identification information recognizer 65.

The plate transport device 64 takes out a sample plate 8 contained in any one of a plurality of sample plate containers 61, and supplies the taken sample plate 8 to the autosampler 7. The plate transport device 64 receives the sample plate 8 from the autosampler 7 after an analysis process is completed, and places the received sample plate 8 in an original sample plate container 61.

In the present embodiment, a sample plate 8 contained in each sample plate container 61 is taken out once from the sample plate container 61 by the plate transport device 64 for reading of a barcode 91 by the reader 63. The plate transport device 64 moves the sample plate 8 taken out from the sample plate container 61 to a position where the reader 63 can perform an operation of reading the barcode 91. When the operation of reading the barcode 91 with respect to the sample plate 8 is completed, the plate transport device 64 transports the sample plate 8 to the original sample plate container 61. A reader 63 may be provided individually for each sample plate container 61.

The identification information recognizer 65 recognizes identification information of a sample plate 8 contained in a sample plate container 61. Specifically, the identification information recognizer 65 acquires the identification information of a contained sample plate 8 from the information received from the reader 63. Then, the identification information recognizer 65 supplies the recognized identification information of the sample plate 8 and the number of the sample plate container 61 containing the sample plate 8 to the identification information presenter 66.

The identification information presenter 66 transmits the identification information of the sample plate 8 received from the identification information recognizer 65 and the number of the sample plate container containing the sample plate 8 to the control device 4. The control device 4 transmits the identification information of the sample plate 8 and the number of the sample plate container 61 containing the sample plate 8, which are received from the identification information presenter 66, to the computer 1 via the control device 4.

The computer 1 includes a subject plate setter 11, a subject plate storage 12, an identification information acquirer 13, a supply instructor 14, a print module 15, a monitor 18 and an operation unit 19. The supply instructor 14 has a process instructor 141. The computer 1 is constituted by a CPU (Central Processing Unit), a RAM (Random Access Memory), a ROM (Read Only Memory) and a storage device such as a hard disc. A computer program such as a second control program is stored in the ROM. The CPU executes the second control program stored in the ROM or the storage device on the RAM, whereby functions of the subject plate setter 11, the identification information acquirer 13, the supply instructor 14 and the print module 15 are implemented. Part or all of these functions 10 may be implemented by hardware such as an electronic circuit. Further, an examination program for examining chromatogram data is installed in the computer 1. In this manner, the computer 1 functions as a CDS (Chromatography data system) using the second control program and the examination program. The subject plate storage 12 is constituted by a storage device such as a RAM or a hard disc.

The subject plate setter 11 makes settings of an analysis process with respect to a sample plate 8 to be analyzed. A sample plate 8 to be analyzed is referred to as a subject sample plate 8T for the sake of explanation in the following description. The subject plate setter 11 sets plate identification information of a subject sample plate 8T, the number of a sample vial, a sample type and the name of a method file in association with one another as one record. The subject plate setter 11 can set a plurality of records in which plate identification information pieces of subject sample plates 8T, the numbers of sample vials, sample types and the names of method files are respectively associated with one another. The subject plate setter 11 puts a plurality of records having the same plate identification information of a subject sample plate 8T into a group and sets the group as a batch table.

The subject plate storage 12 stores a batch table that is set with respect to subject sample plates 8T in the subject plate setter 11.

The identification information acquirer 13 receives identification information of a sample plate 8 and the number of a sample plate container 61 containing the sample plate 8, which have been transmitted by the identification information presenter 66 via the control device 4.

The supply instructor 14 compares the identification information of a subject sample plate 8T stored in the subject plate storage 12 with the identification information of a sample plate 8 acquired by the identification information acquirer 13. In a case where the identification information of the subject sample plate 8T stored in the subject plate storage 12 matches the identification information of the sample plate 8 acquired by the identification information acquirer 13, the supply instructor 14 determines that the sample plate 8 contained in the sample plate container 61 is a subject sample plate 8T to be processed. In a case where determining that the subject sample plate 8T is contained in the sample plate container 61, the supply instructor 14 provides an instruction for supplying the sample plate by the sample plate supply control system 20. The content of a process of providing an instruction for supplying a sample plate will be described below in detail.

The print module 15 generates a barcode 91 to be attached to a subject sample plate 8T and provides an instruction for printing. The print module 15 instructs the printer 9 to print the barcode 91.

(4) Behavior of Setting Plate by Computer

Figure 5:
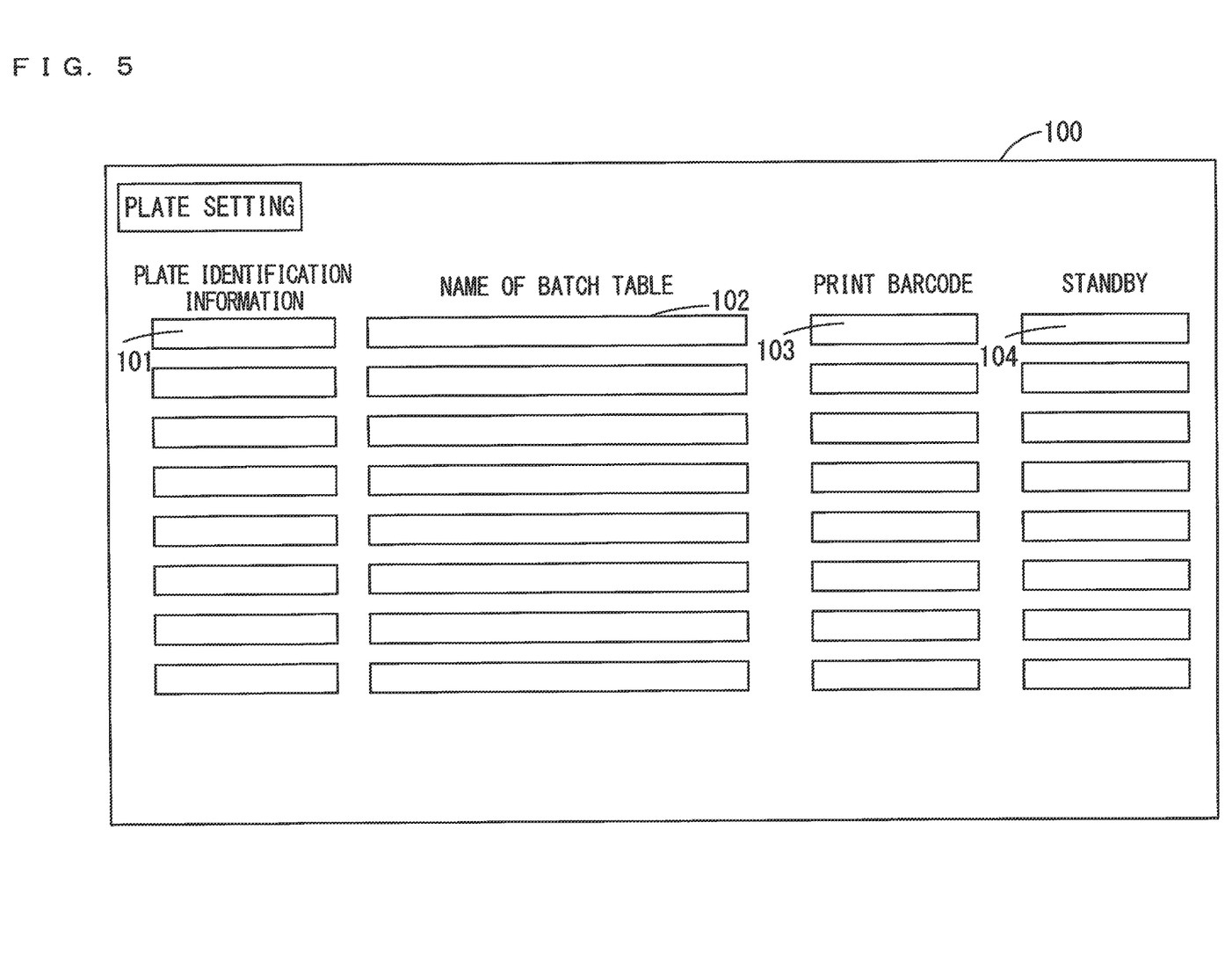
FIG. 5 is a diagram showing a plate setting screen displayed in a monitor of a computer according to the present embodiment.

Next, a plate setting operation of setting a subject sample plate 8 will be described. The plate setting operation is performed by the subject plate setter 11 included in the computer 1. FIG. 5 is a diagram showing a plate setting screen 100 displayed in the monitor 18 of the computer 1 when the subject plate setter 11 is executed.

The plate setting screen 100 includes a plate identification information field 101 in which identification information of a subject sample plate 8T is input, a batch table name field 102 for designation of the name of a batch table, a barcode print instruction button 103 and a standby instruction button 104.

In the plate identification information field 101, the identification information for specifying a subject sample plate 8T is input by the user. The user operates the operation unit 19 of the computer 1 and inputs the identification information for specifying a subject sample plate 8T using characters, numerals, symbols or a combination of these. The user may set any identification information to be input. Alternatively, the identification information to be input is set in accordance with an analysis manual or the like.

In the batch table name field 102, the name of a batch table selected by the user is input. In the present embodiment, the subject plate setter 11 acquires a batch table from the batch table DB 30 stored in the server 3 shown in FIG. 1. The user operates the operation unit 19 and can cause a screen showing a list of batch tables to be displayed by adjusting a pointer to the batch table name field 102. The subject plate setter 11 accesses the batch table DB 30 of the server 3, acquires a prepared list of a plurality of batch tables and causes the monitor 18 to display the list in the screen.

In the present embodiment, the subject plate setter 11 accesses the batch table DB 30 of the server 3, whereby the user can set a batch table. That is, the user can select a prepared batch table. For example, the user may be able to create a batch table in the plate setting screen 100. Alternatively, the user may be able to edit a batch table, which the user has acquired from the server 3, in the plate setting screen 100.

The barcode print instruction button 103 generates a barcode 91 and provides an instruction for printing the barcode 91. In a case where the user operates the operation unit 19 to select the barcode print instruction button 103, the print module 15 generates image data of the barcode 91. The print module 15 converts the identification information input in the plate identification information field 101 into a barcode and generates image data of the barcode 91. The print module 15 transmits an instruction for printing the image data of the generated barcode 91 to the printer 9.

The printer 9 generates a sticker on which the image of the barcode 91 is printed. As shown in FIGS. 2A and 2B, the user attaches the sticker on which the barcode 91 is printed to a predetermined position on the back surface of a sample plate 8. In the present embodiment, the reader 63 performs a reading operation with respect to the back surface of a sample plate 8, so that the sticker of the barcode 91 is attached to the back surface of the sample plate 8. Depending on the configuration of the reader 63, the sticker of the barcode 91 may be attached to the side surface or the upper surface of a sample plate 8.

With the above-mentioned operation, a batch table corresponding to a subject sample plate 8T is set. Further, the identification information of a subject sample plate 8T is converted into a barcode, and a sticker of a barcode 91 is printed. As shown in FIG. 2B, the user attaches the sticker of the barcode 91 to a predetermined position on the back surface of a subject sample plate 8T.

Reference is made to FIG. 5 again. Next, the user operates the operation unit 19 to select the standby instruction button 104. In response to this operation, the subject plate setter 11 stores the information set in the plate setting screen 100 in the subject plate storage 12. The subject plate storage 12 stores the identification information of a subject sample plate 8T and a batch table.

The user selects the standby instruction button 104 and then moves to the location of the plate changer 6. The user places the subject sample plate 8T in any sample plate container 61 in the plate changer 6. At this time, the user may place the subject sample plate 8T in any sample plate container 61. While a large number of sample plate containers 61 are prepared as shown in FIG. 3 in the present embodiment, the user may place the subject sample plate 8T in any sample plate container 61.

Preparation for an analysis process is completed by the above-mentioned operations and processes. That is, the user inputs the identification information of the subject sample plate 8T in the plate setting screen 100. The user sets the batch table in the plate setting screen 100. The user prints the sticker of a barcode 91 and attaches the sticker to the subject sample plate 8T. The user selects the standby instruction button 104, whereby the subject plate storage 12 stores the identification information of the subject sample plate 8T and the batch table. Then, the user places the subject sample plate to which the sticker of the barcode 91 is attached in any sample plate container 61. Next, a process of supplying a sample plate 8 starts.

(5) Behavior of Supplying Sample Plate by Plate Changer and Computer

When the user places a subject sample plate 8T in any sample plate container 61, an operation of reading a barcode 91 is performed by the reader 63 in the plate changer 6. The reader 63 supplies the information of the barcode 91 and the number of the sample plate container 61 containing the sample plate 8 to the identification information recognizer 65. Since whether the sample plate 8 is a subject sample plate 8T has not been recognized in the subsequent process, the sample plate 8 is not referred to as a subject sample plate 8T but simply referred to as a sample plate 8. The identification information recognizer 65 recognizes the identification information of the contained sample plate 8 from the received information of the barcode 91. Then, the identification information recognizer 65 supplies the recognized identification information of the sample plate 8 and the number of the sample plate container 61 containing the sample plate 8 to the identification information presenter 66.

The identification information presenter 66 transmits the identification information of the sample plate 8 and the number of the sample plate container 61 to the control device 4. The control device 4 transmits the identification information of the sample plate 8 and the number of the sample plate container 61 to the computer 1. Next, the behavior of providing an instruction for supplying the sample plate 8 by the computer 1 is described with reference to the flowchart of FIG. 6.

Figure 6:
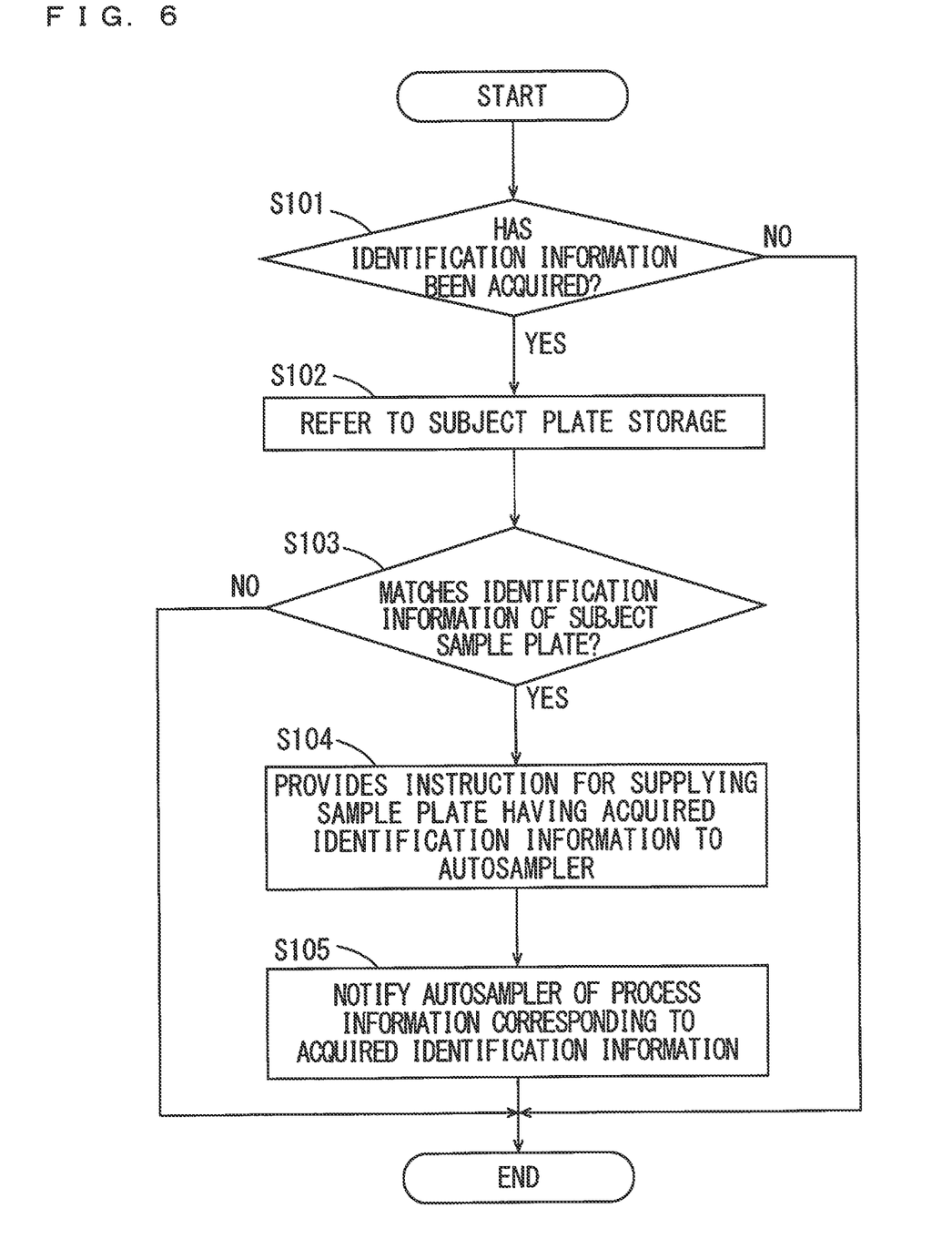
FIG. 6 is a flowchart of a process executed in the computer according to the present embodiment.

FIG. 6 is a flowchart showing a process executed by the identification information acquirer 13 and the supply instructor 14 of the computer 1. First, the identification information acquirer 13 of the computer 1 checks whether the identification information of the sample plate 8 and the number of the sample plate container 61 have been acquired (step S101). In a case where the identification information acquirer 13 acquires the identification information of the sample plate 8 and the number of the sample plate container 61, the supply instructor 14 makes reference to the subject plate storage 12 (step S102). In a case where the identification information acquirer 13 does not acquire the identification information of the sample plate 8 and the number of the sample plate container 61, the process ends.

After the step S102, the supply instructor 14 determines whether the identification information of a subject sample plate 8T stored in the subject plate storage 12 matches the identification information of the sample plate 8 acquired by the identification information acquirer 13 (step S103). In a case where the identification information of the subject sample plate 8T stored in the subject plate storage 12 matches the identification information of the sample plate 8 acquired by the identification information acquirer 13, the supply instructor 14 determines that the sample plate 8 contained in the sample plate container 61 is a subject sample plate 8T to be processed. In a case where determining that the subject sample plate 8T is contained in the sample plate container 61, the supply instructor 14 instructs the plate changer 6 to supply the subject sample plate 8T. That is, the supply instructor 14 instructs the plate changer 6 to supply the sample plate 8 having the identification information acquired by the identification information acquirer 13 to the autosampler 7 (step S104). Alternatively, the supply instructor 14 instructs the plate changer 6 to supply the sample plate 8 contained in the sample plate container 61 having the number acquired by the identification information acquirer 13 to the autosampler 7. In a case where the identification information of the subject sample plate 8T stored in the subject plate storage 12 does not match the identification information of the sample plate 8 acquired by the identification information acquirer 13, the supply instructor 14 ends the process.

After the step S104, the process instructor 141 makes reference to the subject plate storage 12 and acquires a batch table corresponding to the subject sample plate 8T. Then, the process instructor 141 notifies the autosampler 7 of the information relating to an analysis process based on the batch table (step S105). With the process mentioned above, the plate changer 6 supplies the subject sample plate 8T to the autosampler 7. Then, a sample is extracted from a sample vial contained in the subject sample plate 8T by the autosampler 7, and the sample is injected into the analysis device.

As described above, the sample plate supply control system 20 of the present embodiment acquires the identification information of a sample plate 8 contained in any sample plate container 61 among the plurality of sample plate containers 61. Then, in a case where the identification information of a subject sample plate 8T matches the identification information of the sample plate 8 acquired by the identification information acquirer 13, the sample plate supply control system 20 supplies the sample plate 8 the identification information of which has been acquired to the autosampler 7. Thus, even in a case where the sample plate 8 is contained in any sample plate container 61, the subject sample plate 8T stored in the subject plate storage 12 is supplied to the autosampler 7.

The user does not have to be conscious of which sample plate container 61 the sample plate 8 is to be contained in in the plate changer 6. The user may place the sample plate 8 in an available sample plate container 61. An analysis process does not start with respect to a different sample plate 8 due to an erroneous operation. Even in a case where a plurality of users use a common plate changer 6, each user can freely utilize an available sample plate container 61.

Further, in a case where the identification information of the subject sample plate 8T matches the identification information of the sample plate 8 acquired by the identification information acquirer 13, the sample plate supply control system 20 supplies the content of a batch table stored in the subject plate storage 12 to the autosampler 7. Thus, even in a case where the sample plate 8 is contained in any sample plate container 61, the analysis process is started with respect to the subject sample plate 8T stored in the subject plate storage 12 based on the batch table stored in the subject plate storage 12.

[2] Second Embodiment

Figure 7:
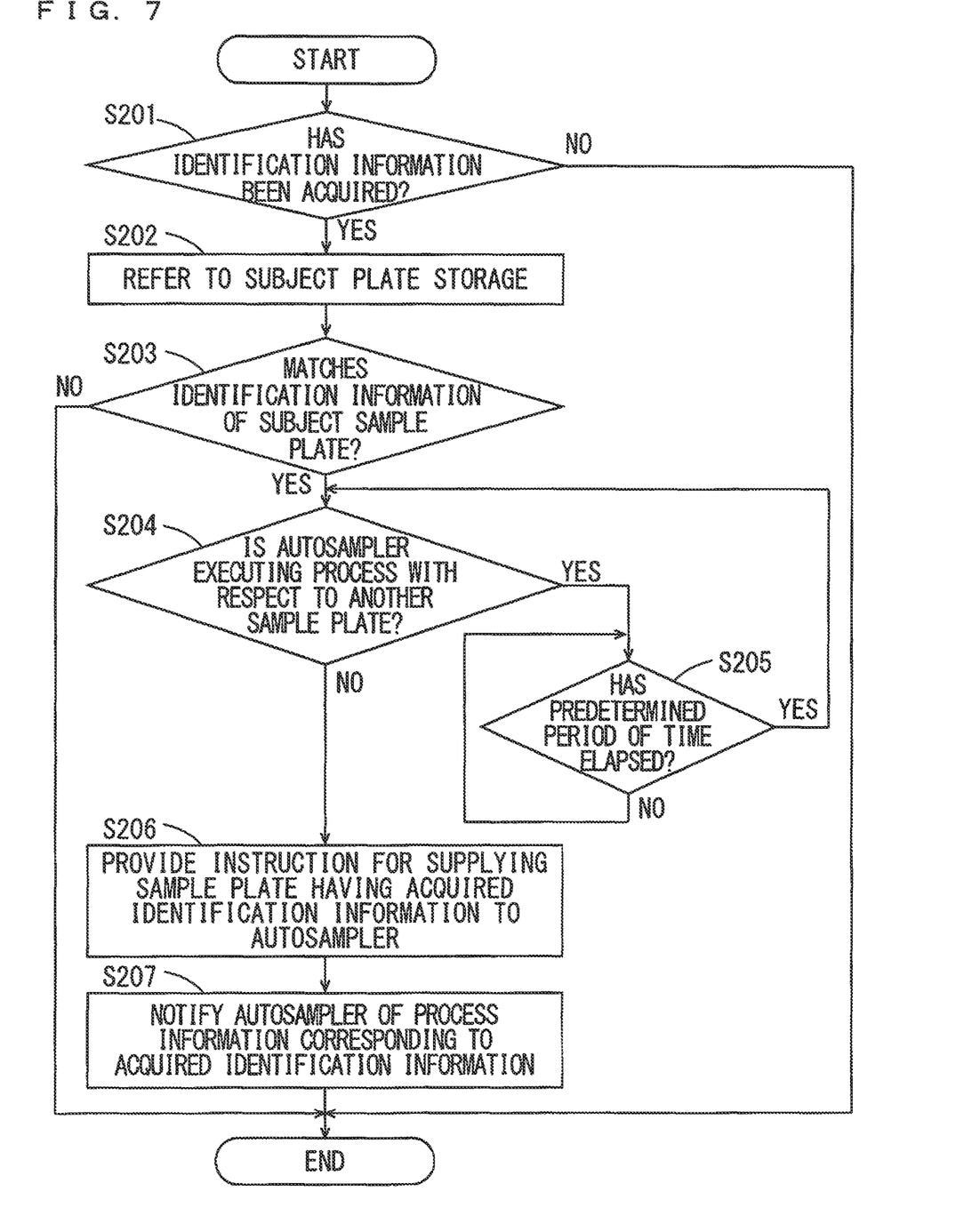
FIG. 7 is a flowchart of the process executed in the computer according to the present embodiment.

Next, a second embodiment of the present invention will be described. In the second embodiment, when an autosampler 7 is executing an analysis process, a plate changer 6 is in a waiting state. FIG. 7 is a flowchart showing a process executed by an identification information acquirer 13 and a supply instructor 14 of a computer 1 in the second embodiment. First, the identification information acquirer 13 of the computer 1 checks whether the identification information of a sample plate 8 and the number of a sample plate container 61 have been acquired (step S201). In a case where the identification information acquirer 13 has acquired the identification information of the sample plate 8 and the number of the sample plate container 61, the supply instructor 14 makes reference to a subject plate storage 12 (step S202). In a case where the identification information acquirer 13 does not acquire the identification information of the sample plate 8 and the number of the sample plate container 61, the process ends.

After the step S202, the supply instructor 14 determines whether the identification information of the subject sample plate 8T stored in the subject plate storage 12 matches the identification information of the sample plate 8 acquired by the identification information acquirer 13 (step S203). In a case where the identification information of the subject sample plate 8T stored in the subject plate storage 12 matches the identification information of the sample plate 8 acquired by the identification information acquirer 13, the supply instructor 14 determines that the sample plate 8 contained in the sample plate container 61 is the subject sample plate 8T to be processed.

In a case where determining that the subject sample plate 8T is contained in the sample plate container 61, the supply instructor 14 determines whether the autosampler 7 is executing a process with respect to another sample plate 8 (step S204). The supply instructor 14 acquires a processing state of the autosampler 7 by making an inquiry to a control device 4. Alternatively, the supply instructor 14 acquires a processing state of the autosampler 7 by making an inquiry to the autosampler 7 via the control device 4.

In a case where the autosampler 7 is executing a process with respect to another sample plate 8, the supply instructor 14 waits fora predetermined period of time (step S205). In a case where the predetermined period of time has elapsed, the supply instructor 14 returns to the step S204 and determines whether the autosampler 7 is executing a process with respect to another sample plate 8. In a case where the autosampler 7 is executing a process with respect to another sample plate 8, the process of the step S204 and the step S205 is repeated.

In a case where the autosampler 7 is not executing a process with respect to another sample plate 8, the supply instructor 14 instructs the plate changer 6 to supply a sample plate 8. The subsequent step S206 and step S207 will not be described since being similar to the step S104 and the step S105 of FIG. 6 in the first embodiment.

As described above, in a case where the identification information of the subject sample plate 8T matches the identification information of the sample plate 8 acquired by the identification information acquirer 13, the sample plate supply control system 20 of the present embodiment determines whether the autosampler 7 is executing a process with respect to another sample plate 8. When the autosampler 7 is executing a process with respect to another sample plate 8, the sample plate supply control system 20 supplies a sample plate 8 to the autosampler 7 after the process with respect to the other sample plate 8 is completed. Thus, even when the autosampler 7 is executing a process with respect to another sample plate 8, reservation of execution of a process with respect to a subject sample plate 8T is made. The user can make settings for a subject sample plate 8T regardless of whether the autosampler 7 is executing a process with respect to another sample plate 8.

[3] Third Embodiment

Next, a third embodiment of the present invention will be described. In the third embodiment, a plurality of subject sample plates 8T are put in a standby state. As a prerequisite for the third embodiment, the identification information of a plurality of subject sample plates 8T is stored in a subject plate storage 12. That is, a user makes settings in regard to a plurality of plate identification numbers and selects a standby instruction button 104 with respect to a plurality of settings, in the plate setting screen 100 shown in FIG. 5. Thus, the plurality of subject sample plates 8T are put in the standby state.

Figure 8:
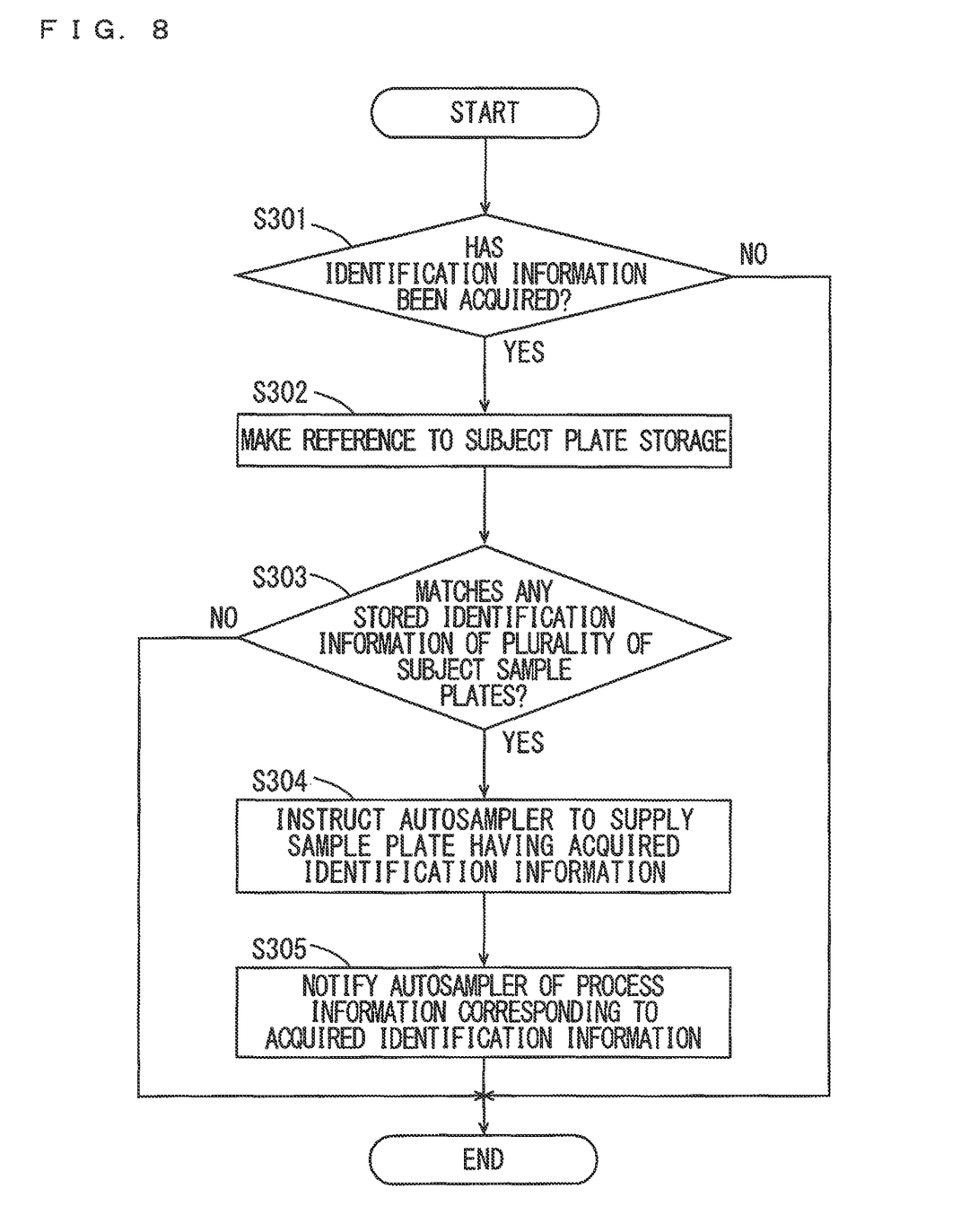
FIG. 8 is a flowchart of the process executed in the computer according to the present embodiment.

FIG. 8 is a flowchart showing a process to be executed by an identification information acquirer 13 and a supply instructor 14 of a computer 1 in the third embodiment. First, the identification information acquirer 13 of the computer 1 checks whether the identification information of a sample plate 8 and the number of a sample plate container 61 have been acquired (step S301). In a case where the identification information acquirer 13 has acquired the identification information of the sample plate 8 and the number of the sample plate container 61, the supply instructor 14 makes reference to the subject plate storage 12 (step S302). In a case where the identification information acquirer 13 does not acquire the identification information of the sample plate 8 and the number of the sample plate container 61, the process ends.

After the step S302, the supply instructor 14 determines a result of reference to the subject plate storage 12. The supply instructor 14 determines whether the identification information of any subject sample plate 8T among the identification information of the plurality of subject sample plates 8T stored in the subject plate storage 12 matches the identification information of the sample plate 8 acquired by the identification information acquirer 13 (step S303). In a case where the identification information of any subject sample plate 8T stored in the subject plate storage 12 matches the identification information of the sample plate 8 acquired by the identification information acquirer 13, the supply instructor 14 determines that the sample plate 8 contained in the sample plate container 61 is a subject sample plate 8T to be processed.

In a case where determining that the subject sample plate 8T is contained in the sample plate container 61, the supply instructor 14 instructs the plate changer 6 to supply the sample plate 8. The subsequent step S304 and step S305 will not be described because being similar to the step S104 and the step S105 of FIG. 6 in the first embodiment.

As described above, in a case where one of a plurality of stored identification information pieces of the subject sample plates 8T matches the identification information of a sample plate 8 acquired by the identification information acquirer 13, a sample plate supply control system 20 of the present embodiment supplies the sample plate 8 to the autosampler 7. Thus, even in a case where a sample plate 8 is contained in any sample plate container 61, any one of the plurality of subject sample plates 8T stored in the subject plate storage 12 is supplied to the autosampler 7. The user can make reservation for an analysis process with respect to a plurality of subject sample plates 8T at the same time.

While preferred embodiments of the present invention have been described above, it is to be understood that variations and modifications will be apparent to those skilled in the art without departing the scope and spirit of the present invention. The scope of the present invention, therefore, is to be determined solely by the following claims.

[4] Correspondences Between Constituent Elements in Claims and Parts in Preferred Embodiments In the following paragraphs, non-limiting examples of correspondences between various elements recited in the claims below and those described above with respect to various preferred embodiments of the present disclosure are explained. In the above-mentioned embodiment, the plate changer 6 is an example of a plate holder, the computer 1 is an example of a terminal device, and the batch table is an example of process information.

Further, in the above-mentioned embodiment, the device that functionally includes the identification information recognizer 65 of the plate changer 6 and the supply instructor 14 of the computer 1 is an example of a sample plate supply device. While one device that functionally includes the identification information recognizer 65 of the plate changer 6 and the supply instructor 14 of the computer 1 is not described by way of example in the above-mentioned embodiment, one device may include both functions.

Further, in the above-mentioned embodiment, the second control program is an example of a sample plate supply control program.

As each of constituent elements recited in the claims, various other elements having configurations or functions described in the claims can be also used.

[5] Other Embodiments

In the above-mentioned embodiment, the plate changer 6 which is an example of a sample plate holder is an another device attached to the autosampler 7. While the sample plate holder may be another device attached to the autosampler 7, a sample plate holder may be included in the autosampler 7.

While the plate changer 6 is used as a device that supplies a sample plate 8 to the autosampler 7 for a liquid chromatograph in the above-mentioned embodiment, a plate changer 6 of the present embodiment can be used as a device that supplies a sample plate 8 to an autosampler used for various analysis devices. Further, an analysis system 10 of the present invention can be used not only for a liquid chromatograph but also for another analysis device such as another type of a liquid chromatograph.

The invention claimed is:

1. A sample plate supply control device that controls supply of a sample plate from a sample plate holder having a plurality of sample plate containers to an autosampler, the plurality of sample plate containers each including therein a respective contained sample plate having corresponding sample plate identification information, the sample plate supply control device comprising:
a subject plate storage that stores user input identification information identifying a subject sample plate to be analyzed, in association with information of a method file relating to an analysis process;
an identification information recognizer that recognizes the sample plate identification information of the contained sample plates, in association with container identification information of the sample plate containers; and
a supply instructor that instructs the sample plate holder to supply the sample plate from the sample plate container to the autosampler, the sample plate container having the recognized container identification information associated with the recognized sample plate identification information that matches the sample plate identification information associated with the method file, in a case where the analysis process of the method file is performed.

2. The sample plate supply control device according to claim 1, wherein
the supply instructor has a process instructor, which notifies the autosampler of process information and provides an instruction for executing the analysis process on the sample plate supplied by the sample plate holder.

3. The sample plate supply control device according to claim 1, wherein the supply instructor waits until another analysis process being executed on another plate in the autosampler is completed to instruct the sample plate holder to supply the sample plate from the one sample plate container to the autosampler.

4. The sample plate supply control device according to claim 1, further comprising a print module that prints the identification information of the subject sample plate to be attached to the subject sample plate.

5. The sample plate supply control device according to claim 1, wherein the identification information of the subject sample plate is attached to the subject sample plate as a barcode image.

6. The sample plate supply control device according to claim 1, further comprising a subject plate setter that sets the user input identification information of the subject sample plate and the method file relating to the analysis process, in association with each other, wherein
the supply instructor has a process instructor that acquires the method file associated with the subject sample plate by the subject plate setter and instructs the autosampler to execute the analysis process based on the method file.

7. A sample plate supply control system comprising:
an autosampler that injects a sample to be analyzed into an analysis device;
a sample plate holder that has a plurality of sample plate containers, the plurality of sample plate containers each including therein a respective contained sample plate having corresponding sample plate identification information; and
a terminal device that controls the sample plate holder, wherein
the sample plate holder includes
an identification information recognizer that recognizes the sample plate identification information of contained sample plates, in association with the container identification information of the sample plate containers, and
an identification information presenter that supplies the identification information of the contained sample plates to the terminal device, and
the terminal device includes:
a subject plate storage that stores user input identification information identifying a subject sample plate to be analyzed, in association with information of a method file relating to an analysis process;
an identification information acquirer that acquires the identification information of the contained sample plate from the sample plate holder, and a supply instructor that instructs the sample plate holder to supply the sample plate from the sample plate container to the autosampler, the sample plate container having the recognized container identification information associated with the recognized sample plate identification information that matches the sample plate identification information associated with the method file, in a case where the analysis process of the method file is performed.

8. The sample plate supply control system according to claim 7, wherein
the sample plate holder has a plurality of displays provided to correspond to the plurality of sample plate containers, and
each display displays a processing state in regard to each sample plate contained in each sample plate container.

9. A sample plate supply control method of controlling supply of a sample plate from a sample plate holder having a plurality of sample plate containers to an autosampler, the plurality of sample plate containers each including therein a respective contained sample plate having corresponding sample plate identification information, the sample plate supply control method including:
acquiring identification information identifying the contained sample plates from the sample plate holder, in association with container identification of the sample plate containers, wherein the identification information is input by a user and stored in a subject plate storage in association with information of a method file relating to an analysis process;

instructing the sample plate holder to supply the sample plate from the sample plate container to the autosampler, the sample plate container having the recognized container identification information associated with the recognized sample plate identification information that matches the sample plate identification information associated with the method file, in a case where the analysis process of the method file is performed.

10. A non-transitory computer readable medium storing a sample plate supply control program that controls supply of a sample plate from a sample plate holder having a plurality of sample plate containers to an autosampler, the plurality of sample plate containers each including therein a respective contained sample plate having corresponding sample plate identification information, the sample plate supply control program causing a computer to execute the processes of:

acquiring identification information identifying the contained sample plates from the sample plate holder, in association with container identification of the sample plate containers, wherein the identification information is input by a user and stored in a subject plate storage in association with information of a method file relating to an analysis process;

instructing the sample plate holder to supply the sample plate from the sample plate container to the autosampler, the sample plate container having the recognized container identification information associated with the recognized sample plate identification information that matches the sample plate identification information associated with the method file, in a case where the analysis process of the method file is performed.

* * * * *